(12) United States Patent
Thurow et al.

(10) Patent No.: US 6,375,170 B1
(45) Date of Patent: Apr. 23, 2002

(54) SPRING SYSTEM

(75) Inventors: Gerhard Thurow, Garbsen; Roland Altsinger, Burgdorf, both of (DE)

(73) Assignee: Contitech Luftfedersysteme GmbH, Hannover (DE)

(*) Notice: Subject to any disclaimer, the term of this patent is extended or adjusted under 35 U.S.C. 154(b) by 0 days.

(21) Appl. No.: 09/436,760

(22) Filed: Nov. 9, 1999

(30) Foreign Application Priority Data

Nov. 9, 1998 (DE) .......................... 198 51 463

(51) Int. Cl.[7] .................. F16F 5/00; F16F 9/22
(52) U.S. Cl. ............... 267/122; 267/64.21; 267/64.24; 267/64.25
(58) Field of Search .......... 267/64.19, 64.21, 267/64.23, 64.24, 64.22, 64.25, 64.27, 122, 123

(56) References Cited

U.S. PATENT DOCUMENTS

| | | | |
|---|---|---|---|
| 2,846,983 A | * 8/1958 | Otto | 267/122 |
| 4,493,481 A | * 1/1985 | Merkle | 267/64.25 |
| 5,477,946 A | * 12/1995 | Kawamata et al. | 188/267 |

FOREIGN PATENT DOCUMENTS

| | | | |
|---|---|---|---|
| DE | 1909373 | * | 11/1972 |
| DE | 1680564 | * | 9/1976 |
| DE | 2648221 | * | 5/1977 |
| DE | 19702947 | * | 5/1999 |

* cited by examiner

*Primary Examiner*—Matthew C. Graham
(74) *Attorney, Agent, or Firm*—Walter Ottesen

(57) ABSTRACT

The invention is directed to a spring system for a vehicle including a two-wheel vehicle. The spring system includes first and second spring units mounted coaxially to each other. The first spring unit includes a first roll-off piston and a first rolling-lobe resilient member coacting with the first roll-off piston during operation of the spring system. The second spring unit includes a second roll-off piston and a second rolling-lobe resilient member coacting with the second roll-off piston during operation of the spring system.

12 Claims, 6 Drawing Sheets

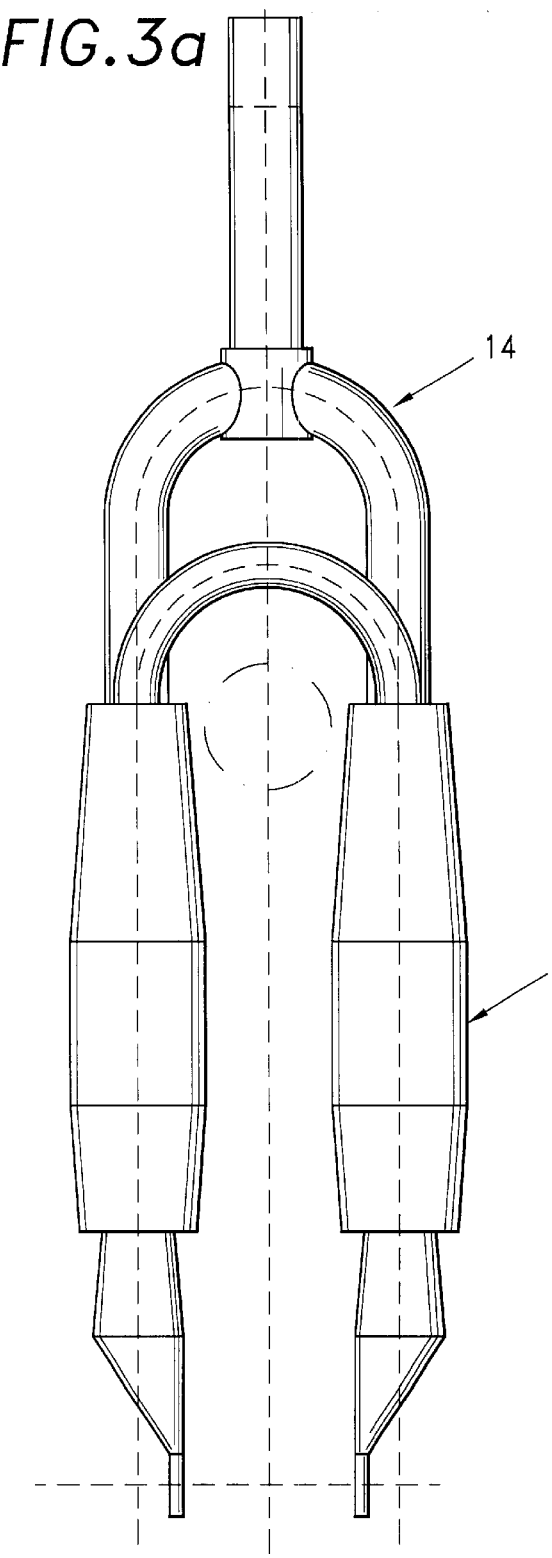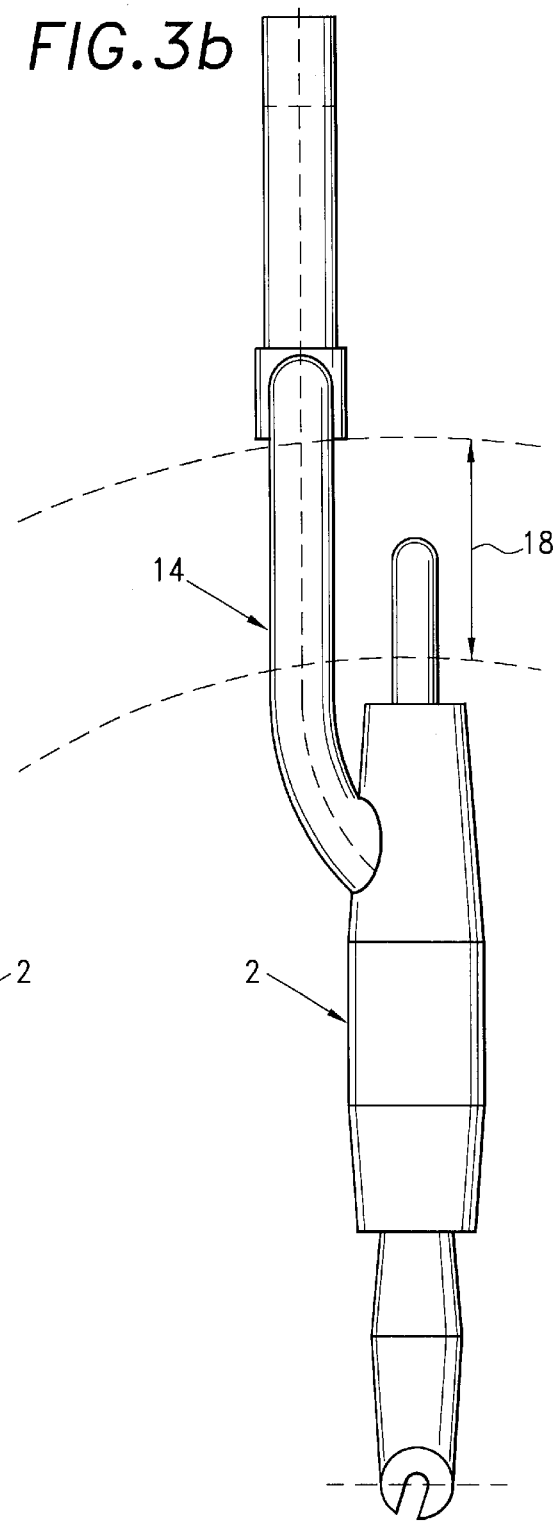

SPRING SYSTEM

FIELD OF THE INVENTION

The invention relates to a spring system especially for use with the front wheel fork of a two-wheel vehicle.

BACKGROUND OF THE INVENTION

The spring elements, which are known in the two-wheel industry for suspending a wheel, are usually built up in accordance with the principle of the telescope spring strut (telescope fork). In this connection, reference can be made to German patent publications 1,680,564 and 2,648,221.

The invention proceeds from air springs which are known for wheel suspensions in two-track vehicles.

An air spring essentially comprises a resilient member which is delimited by a cover plate at its upper end at the chassis and, at its lower end, a roll-off piston is attached which is fixed at the wheel. As a rule, the resilient member is provided with a support unit (support bell) attached to the cover plate in order to prevent lateral offset during spring deflection. Notwithstanding the support unit, conventional air springs cannot ensure an axial guidance of the wheel (which is to be suspended) along the spring deflection path. For this reason, the wheels or the wheel axles must be guided by guide linkages. The wheels or axles, which are suspended on the guide linkages, define an arcuately-shaped spring path. For this reason, the support unit must be elastically attached to the cover plate as shown, for example, in German patent publication 1,909,373.

SUMMARY OF THE INVENTION

It is an object of the invention to provide a shock-absorbing strut especially for a two-wheel vehicle. It is a further object of the invention to provide such a shock-absorbing strut wherein the use of guide linkages or other external guide elements is not needed.

The spring system of the invention is for a vehicle including a two-wheel vehicle. The spring system includes: first and second spring units mounted coaxially to each other; the first spring unit including a first roll-off piston and a first rolling-lobe resilient member coacting with the first roll-off piston during operation of the spring system; and, the second spring unit including a second roll-off piston and a second rolling-lobe resilient member coacting with the second roll-off piston during operation of the spring system.

The invention is based on the fact that the roll-off piston of a conventional air spring would tilt away if one would not prevent a swinging away with the aid of externally mounted guide members. An unwanted swinging away of the pistons is no longer possible even without externally mounted guide linkages because of a rigid connection of the two roll-off pistons of the two air spring elements mounted axially facing each other.

In such an arrangement, the two roll-off pistons take over the mutual guidance of the movable parts. A reliable guidance is ensured already without the use of an outer jacket.

According to the invention, both spring elements are not mounted in series one behind the other in the same direction (which would result in increased spring strength); instead, the two spring elements are configured so as to be mirror images of each other whereby an especially soft spring action results which is especially of advantage in the forward wheel fork of bicycles.

An essential effective element for configuring the differential air spring according to the invention is realized in the conicality of double roll-off pistons and/or a common outer jacket. The angle of inclination relative to the longitudinal axis of the spring is preferably 5 to 45°. Special spring characteristic lines can be realized by adapting the roll-off contour.

According to an embodiment of the invention, the air spring element operates in accordance with the push-pull principle and can be damped in that the spring element defines two separate air chambers which are connected to each other by suitable throttle elements.

The double rolling-lobe resilient member according to the invention can also be filled with a hydraulic liquid in lieu of a gas which is especially air. The hydraulic liquid is an incompressible medium. Preferably a pressure store is used in order to achieve the volume exchange, which is required when using an incompressible hydraulic medium, for the compression and expansion operation of the spring. The pressure store has a feed line into which damping elements can be connected.

BRIEF DESCRIPTION OF THE DRAWINGS

The invention will now be described with reference to the drawings wherein:

FIG. 3a is a front elevation view of the forward wheel fork of a two-wheel vehicle equipped with the spring system according to the invention;

FIG. 3b is a side elevation view of the forward wheel fork of FIG. 3a;

DESCRIPTION OF THE PREFERRED EMBODIMENTS OF THE INVENTION

Figure 1:
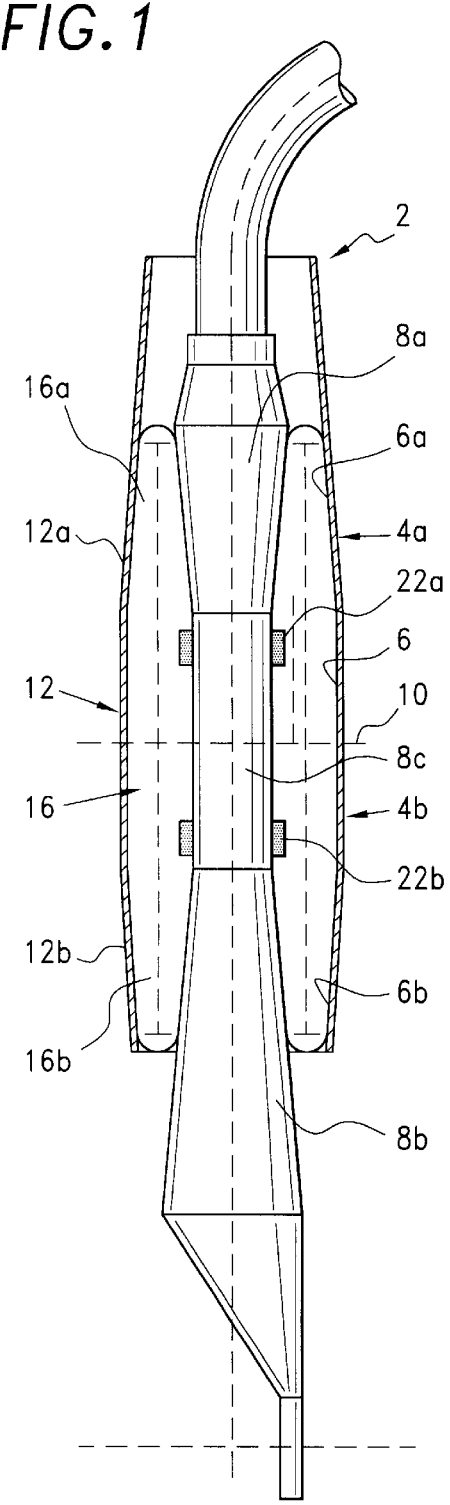
FIG. 1 is a side elevation view, in longitudinal section, of an embodiment of the spring system according to the invention.

FIG. 1 shows a spring system in the form of a gas spring or air spring 2 which includes two air spring elements (4a, 4b) arranged so as to be a mirror image to each other. Each of the two spring elements (4a, 4b) includes essentially a resilient member (6a, 6b) and a double roll-off piston (8a, 8b). The roll-off pistons (8a, 8b) are connected by a shank 8c. The ends of resilient member 6 are attached to shank 8c with two metal clamp rings (22a, 22b). These clamp rings (22a, 22b) are deformed inwardly and clamp the respective ends of the resilient member 6.

A cover plate, which is required by a conventional air spring, can be omitted in an embodiment according to the invention when, as here, a support unit (support bell) (12a, 12b) is provided for laterally limiting the resilient member (6a, 6b). The omitted cover plate is represented by the broken line 10. In this embodiment, the two resilient members (6a, 6b) are formed as a single piece, that is, the two resilient members 6a and 6b conjointly define a double resilient member 6 having two rolling lobes. The two roll-off pistons 8a and 8b and the two support bells 12a and 12b are formed as respective single pieces.

The support bells (12a, 12b) are attached to the forward wheel fork 14 (FIG. 3b) of a bicycle and the roll-off pistons (8a, 8b) are configured so as to be slightly conical and are attached to the hub of the forward wheel (not shown).

The common interior space 16 (16a+16b) of the double rolling-lobe resilient member 6 can be filled with air via the double roll-off piston (8a, 8b). For example, a line leading from a pressure source can be formed in the double roll-off piston member (8a, 8b, 8c) and open into the interior space 16.

Figure 2:
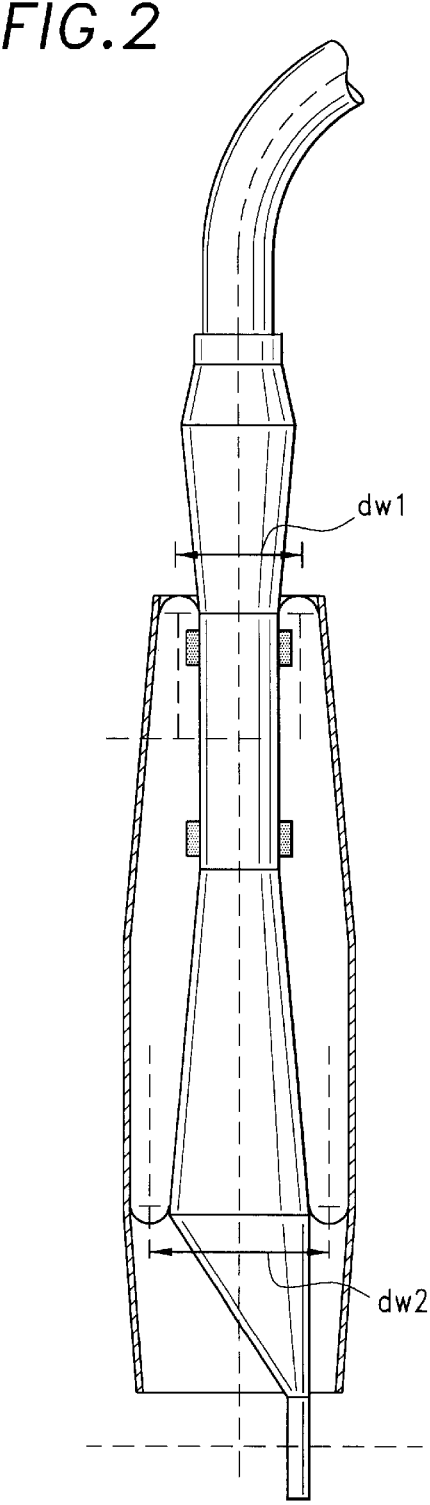
FIG. 2 is the same spring system shown in FIG. 1 but in the compressed or downwardly deflected state and is likewise shown in longitudinal section.

In the spring deflecting operation (spring deflection path 18 of the forward wheel, FIG. 3b), the one part 6b of the double rolling-lobe resilient member 6 is compressed with the aid of a part 8b of the double roll-off piston (8a, 8b); whereas, at the same time, the other part 6a of the double rolling-lobe resilient member 6 is relieved with the aid of the other part 8a of the double roll-off piston (8a, 8b). The spring force arises with the spring deflection because of the difference of the effective diameters (dw1, dw2). The effective area is an annular area in the form of a circular ring area defined by the difference of the area of the effective diameter dw2 of the large fold and the area of the effective diameter dw1 of the small fold. The effective diameter dw1 for the upper lobe and the effective diameter dw2 for the lower lobe are shown in FIG. 2. In addition, a pressure increase arises because of the compression of the gas volume in the interior space of the double rolling-lobe resilient member.

Figure 4:
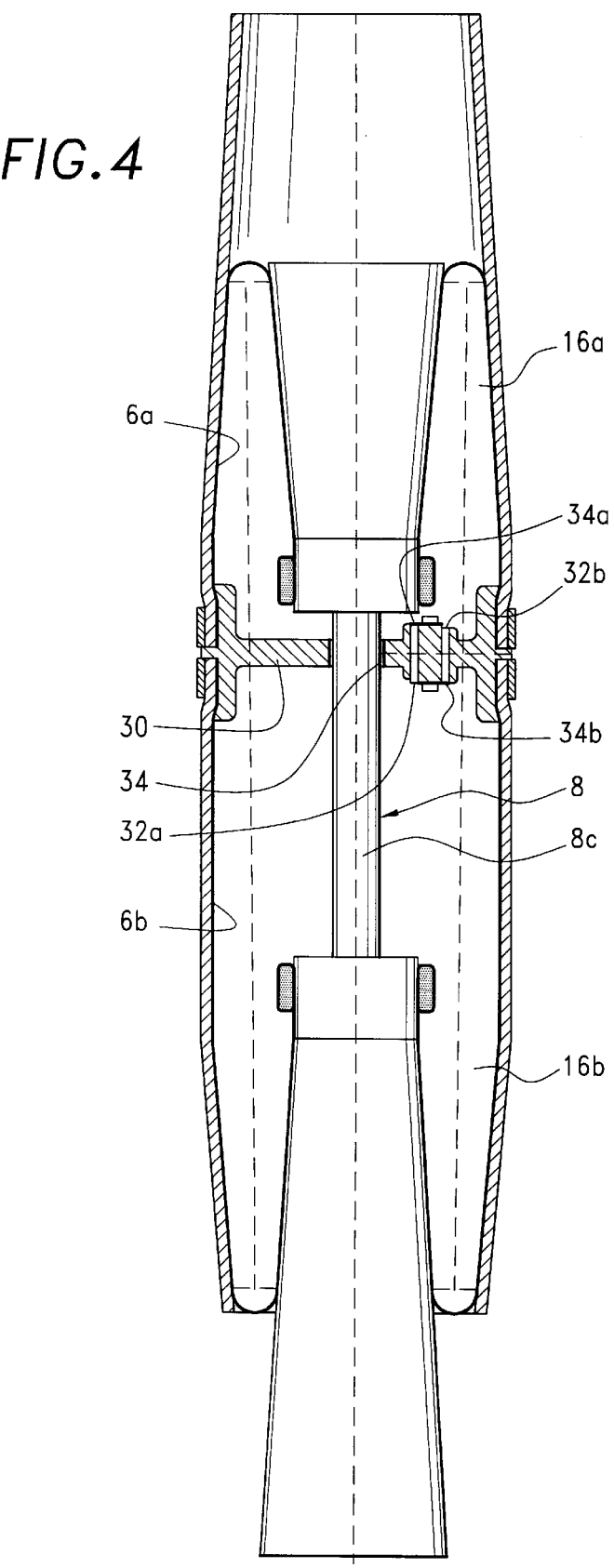
FIG. 4 is a side elevation view of an embodiment of the spring system of the invention wherein the resilient member is partitioned into two chambers by a partition wall having throttle elements mounted therein.

FIG. 4 shows an air spring provided with a partition wall 30 for partitioning the interior space 16 of the resilient member (6a, 6b) into two component interior spaces (16a, 16b). The partition wall 30 includes throttle elements (32a, 32b) formed in the partition wall 30. The partition wall 30 and the shank 8c of the double roll-off piston 8 conjointly define an interface where a slide seal 34 is provided. FIG. 4 also shows that the resilient members (6a, 6b) are not damaged by the displacement of the partition wall 30. Check valves 34a and 34b are provided on the throttle elements 32a and 32b, respectively, as shown. The valves 34a and 34b are made of resilient material.

The volume flow flowing back and forth between the two resilient member chambers (16a, 16b) are damped with the aid of the throttle elements (32a, 32b); that is, the air spring 2 according to the invention can simultaneously serve as a shock absorber.

Figure 5:
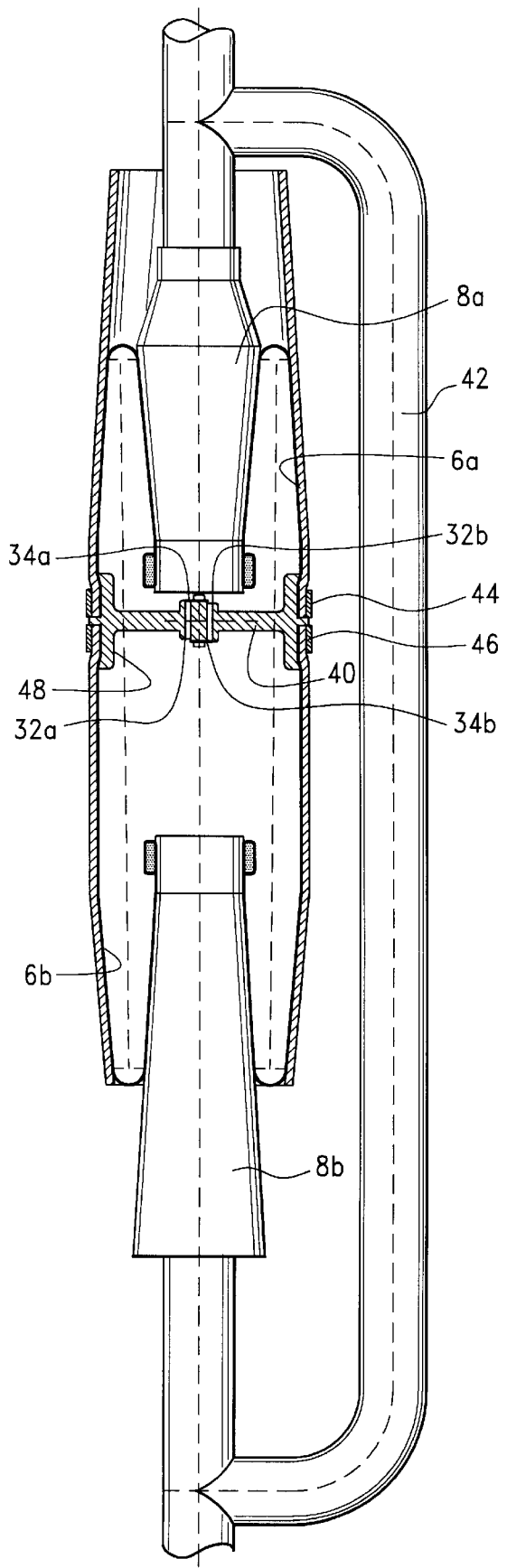
FIG. 5 is an embodiment of the spring system of the invention wherein the roll-off piston is interrupted in the center region and wherein a partition wall extends through the entire air spring partitioning the air spring into two air spring chambers.

FIG. 5 shows another embodiment of the air spring of the invention wherein a partition wall 40 extends clear through the double rolling-lobe resilient member. In the embodiment of FIG. 5, the center shank 8c of the embodiment of FIG. 4 is omitted to permit providing the clear through partition wall 40 which likewise incorporates throttle elements (32a, 32b) and check valves (34a, 34b). A bracket 42 holds the roll-off pistons 8a and 8b rigidly in place. Clamping rings 44 and 46 hold the ends of the two resilient members (6a, 6b) in place against an annular double flange 48.

Figure 6:
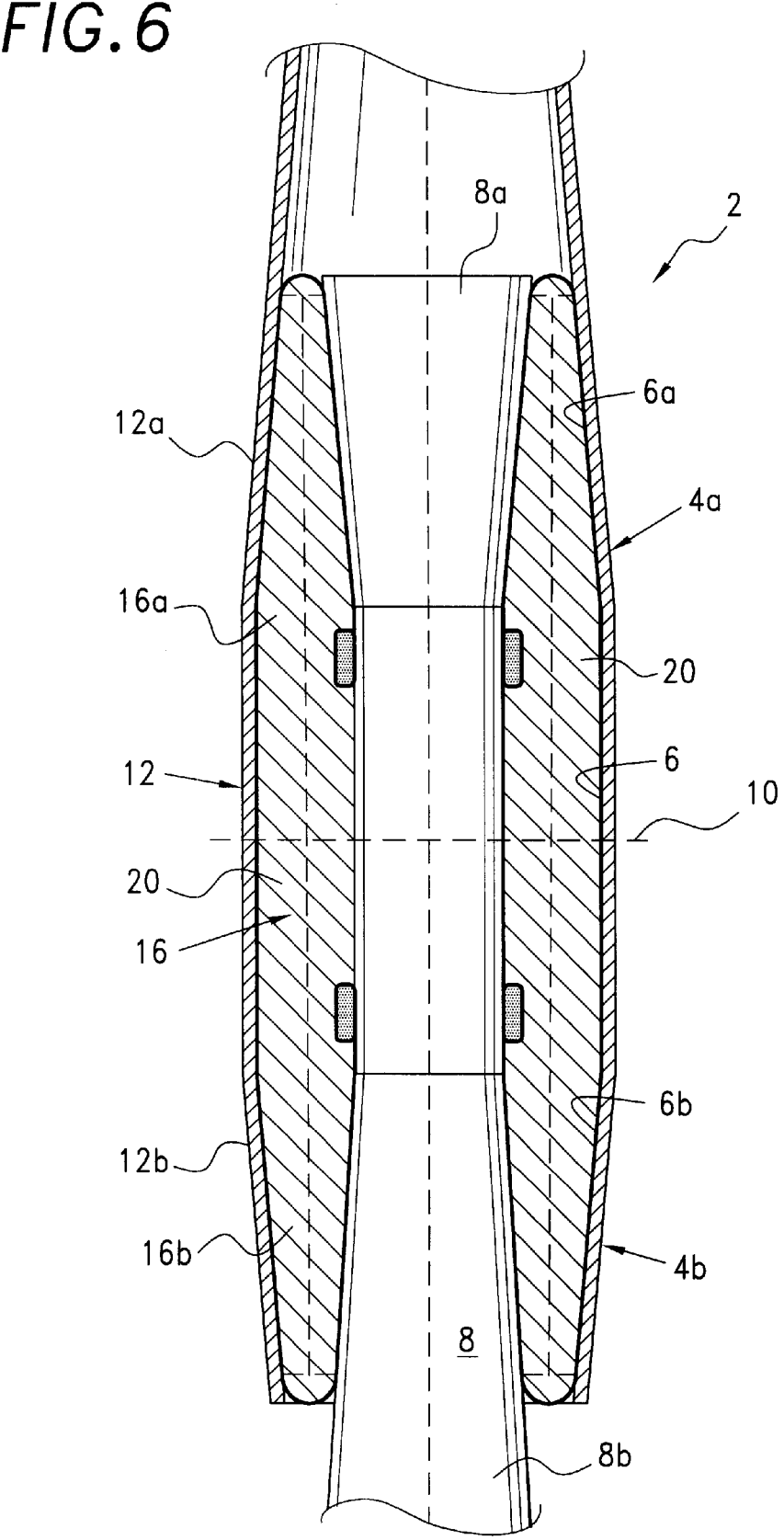
FIG. 6 is a side elevation view of a spring system according to the invention, in longitudinal section, and wherein the spring is filled with a hydraulic liquid; and, FIG. 7 is a schematic of the spring system shown in FIG. 6 equipped with a pressure store and a line leading from the pressure store to the spring chamber filled with the hydraulic liquid.
Figure 7:
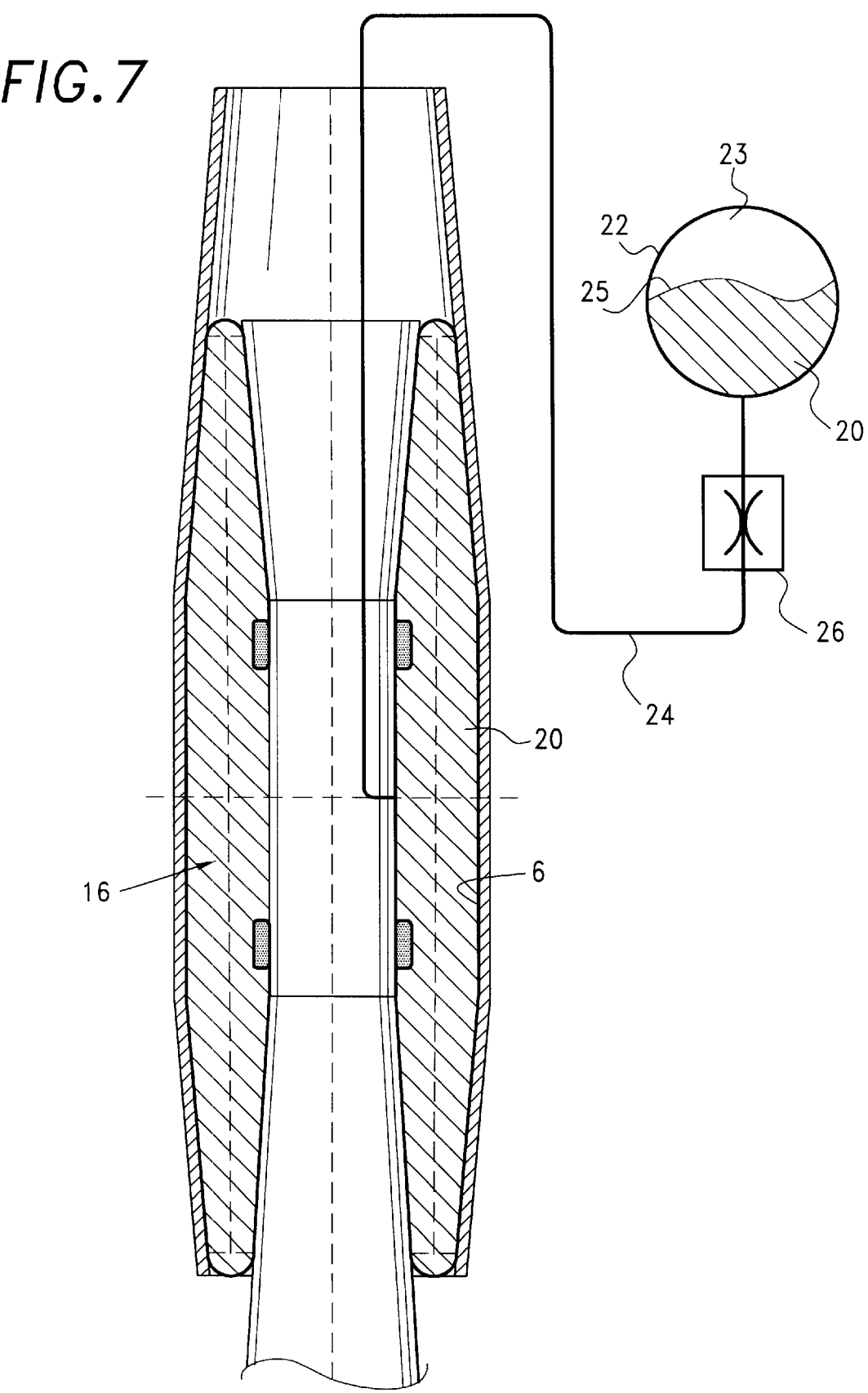

As shown in FIG. 6, the spring system of the invention can be filled with a hydraulic liquid 20 in lieu of air or some other gas. As shown in FIG. 7, a pressure store 22 is provided having a line 24 leading to the interior space 16 of the resilient member 6 with damping elements or throttle 26 mounted in the feed line 24. This arrangement is necessary in order to provide the required volume compensation during the spring action which is required for an incompressible hydraulic liquid. A gas cushion 23 is present in the pressure store 22 above the hydraulic liquid 20 and reference numeral 25 identifies a membrane between the cushion 23 and the hydraulic liquid 20.

In the case of the embodiment wherein the air spring is a double rolling-lobe resilient member air spring as well as a double rolling-lobe resilient hydraulic spring, the enclosed volume 16 (16a+16b) defines a closed system. This volume 16 is enclosed by the double roll-off piston 8 (8a+8b) and the double rolling-lobe resilient member 6 (6a+6b). A pressure store 22 is required for an embodiment in the form of a hydraulic spring. Filling with a gas or hydraulic liquid takes place only once.

It is understood that the foregoing description is that of the preferred embodiments of the invention and that various changes and modifications may be made thereto without departing from the spirit and scope of the invention as defined in the appended claims.

What is claimed is:

1. A spring system and front wheel fork assembly for a two-wheel vehicle having a frame, the spring and front wheel fork assembly comprising:

a bifurcated member for holding a front wheel of said two-wheel vehicle;

said bifurcated member having first and second legs;

first and second spring components mounted coaxially to each other on said first leg so as to face toward each other in the manner of mirror images;

said first spring component including a first roll-off piston and a first rolling-lobe resilient member coacting with said first roll-off piston during operation of said spring system; and, said second spring component including a second roll-off piston and a second rolling-lobe resilient member coacting with said second roll-off piston during operation of said spring system;

said first and second roll-off pistons being formed on said first leg and being rigidly connected to each other so as to define a first double roll-off piston;

third and fourth spring components mounted coaxially to each other on said second leg so as to face toward each other in the manner of mirror images;

said third spring component including a third roll-off piston and a third rolling-lobe resilient member coacting with said third roll-off piston during operation of said spring system;

said fourth spring component including a fourth roll-off piston and a fourth rolling-lobe resilient member coacting with said fourth roll-off piston during operation of said spring system;

said third and fourth roll-off pistons being formed on said second leg and being rigidly connected to each other so as to define a second double roll-off piston;

a first outer jacket common to both of said first and second rolling-lobe resilient members; and, a second outer jacket common to both of said third and fourth rolling-lobe resilient members.

2. The spring system and front wheel fork assembly of claim 1, further comprising a member for connecting said first and second outer jackets to each other and to the frame of said two-wheel vehicle.

3. The spring system and front wheel fork assembly of claim 2, wherein said member for connecting said first and second outer jackets to each other is a single U-shaped member having a bight portion and said single U-shaped member being connected to the vehicle at said bight portion.

4. The spring system and front wheel fork assembly of claim 1, wherein said bifurcated member is a single integral U-shaped piece defining a rigid element for holding the front wheel.

5. The spring system and front wheel fork assembly of claim 1, wherein said first and second rolling-lobe resilient members conjointly define a double rolling-lobe resilient member and a common inner space; and, said third and fourth rolling-lobe resilient members conjointly defining a double rolling-lobe resilient member and a common inner space.

6. The spring system and front wheel fork assembly of claim 5, wherein said enclosed inner spaces are filled with a fluid.

7. The spring system and front wheel fork assembly of claim 6, wherein said fluid is a compressible fluid.

8. The spring system and front wheel fork assembly of claim 6, wherein said fluid is an incompressible fluid.

9. The spring system and front wheel fork assembly of claim 1, each one of said roll-off pistons having a conical surface inclined at an angle $\alpha$ relative to said common longitudinal axis; and, said angle $\alpha$ being in the range of 5° to 45°.

10. The spring system and front wheel fork assembly of claim 1, said first outer jacket having an inner surface comprising upper and lower surface regions corresponding to respective ones of said first and second rolling-lobe resilient members and said upper and lower surface regions being inclined at an angle $\alpha$ relative to said common longitudinal axis; and, said angle $\alpha$ being in the range of 5° to 45°.

11. The spring system and front wheel fork assembly of claim 1, each one of said roll-off pistons having a conical surface inclined at an angle $\alpha$ relative to said common longitudinal axis; and, said outer jacket having an inner surface comprising upper and lower surface regions corresponding to respective ones of said first and second rolling-lobe resilient members and said upper and lower surface regions being inclined at an angle $\alpha$ relative to said common longitudinal axis; and, said angle $\alpha$ being in the range of 5° to 45°.

12. A spring system and front wheel fork assembly for a two-wheel vehicle having a frame, the spring and front wheel fork assembly comprising:

a bifurcated member for holding a front wheel of said two-wheel vehicle;

said bifurcated member being configured as a single integral U-shaped piece and having first and second legs;

first and second spring components mounted coaxially to each other on said first leg;

said first spring component including a first roll-off piston and a first rolling-lobe resilient member coacting with said first roll-off piston during operation of said spring system; and, said second spring component including a second roll-off piston and a second rolling-lobe resilient member coacting with said second roll-off piston during operation of said spring system;

said first and second roll-off pistons being formed on said first leg and being rigidly connected to each other so as to define a first double roll-off piston;

third and fourth spring components mounted coaxially to each other on said second leg so as to face toward each other in the manner of mirror images;

said third spring component including a third roll-off piston and a third rolling-lobe resilient member coacting with said third roll-off piston during operation of said spring system;

said fourth spring component including a fourth roll-off piston and a fourth rolling-lobe resilient member coacting with said fourth roll-off piston during operation of said spring system;

said third and fourth roll-off pistons being formed on said second leg and being rigidly connected to each other so as to define a second double roll-off piston;

a first outer jacket common to both of said first and second rolling-lobe resilient members;

a second outer jacket common to both of said third and fourth rolling-lobe resilient members;

a member for connecting said first and second outer jackets to each other and to the frame of said two-wheel vehicle; and, said member for connecting said first and second outer jackets to each other is a single U-shaped member having a bight portion and said single U-shaped member being connected to the vehicle at said bight portion.

* * * * *